United States Patent
Chung (10) Patent No.: US 6,596,362 B1
(45) Date of Patent: Jul. 22, 2003

(54) WOODEN STAIRTREAD

(76) Inventor: Min-Ju Chung, 3F, No. 21, Lane 83, Rong-Hsing St., Tou-Chia Tsun, Tan-Tzu Hsiang, Taichung Hsien (TW)

( * ) Notice: Subject to any disclaimer, the term of this patent is extended or adjusted under 35 U.S.C. 154(b) by 25 days.

(21) Appl. No.: 10/059,717

(22) Filed: Jan. 29, 2002

(51) Int. Cl.$^7$ ................................................. B32B 3/10
(52) U.S. Cl. ............................ 428/55; 428/54; 428/58; 428/60; 52/179
(58) Field of Search ............................. 428/54, 55, 60, 428/58; 52/177, 179

(56) References Cited

U.S. PATENT DOCUMENTS

5,985,398 A    11/1999   Bellegarde .................... 428/54

*Primary Examiner*—Alexander S. Thomas
(74) *Attorney, Agent, or Firm*—Merchant & Gould P.C.

(57) ABSTRACT

A wooden stairtread includes an elongate nose member, an elongate tread body, and a tread end member. The nose member is made of higher quality wood and has a connecting end surface and two opposite lateral end surfaces. The tread body has first and second connecting end surfaces, and includes multiple core layers, and corresponding upper and lower surface layers. Each upper and lower surface layer is made of higher quality wood and has top and bottom sides that are flush with corresponding upper and lower edges of the connecting end surface of the nose member. Each core layer includes two lateral end members made of higher quality wood, and a middle core member made of lower quality wood. The tread end member is made of higher quality wood and is connected to the second connecting end surface of the tread body.

20 Claims, 8 Drawing Sheets

WOODEN STAIRTREAD

BACKGROUND OF THE INVENTION

1. Field of the Invention

The invention relates to a wooden stairtread, more particularly to a wooden stairtread having all surfaces thereof covered by higher quality wood.

2. Description of the Related Art

Figure 1:
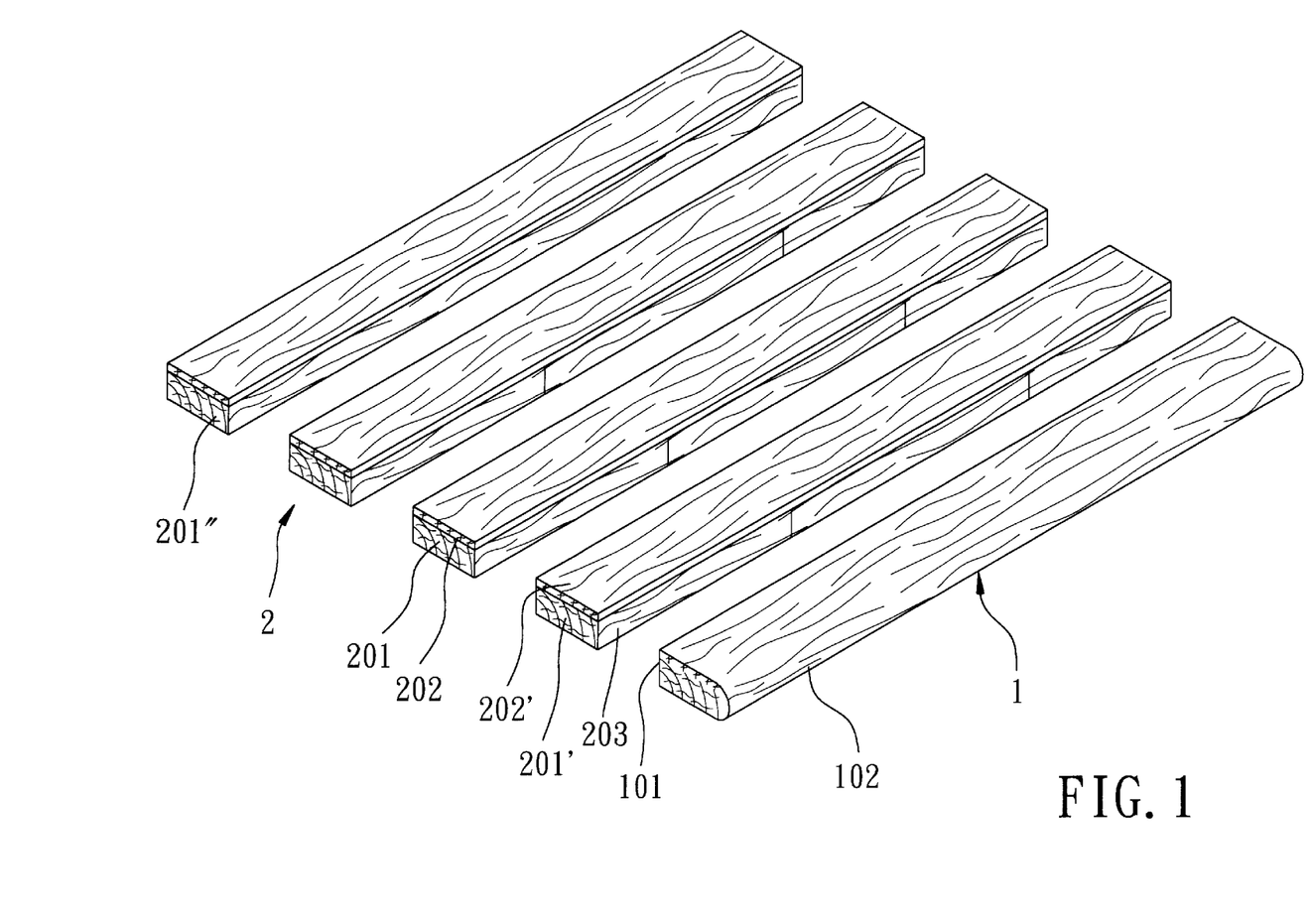
FIG. 1 is an exploded perspective view of a conventional wooden stairtread.

Referring to FIG. 1, a conventional wooden stairtread, as disclosed in U.S. Pat. No. 5,985,398, is shown to have a rectangular shape, a length, height and depth, and includes a nose member 1 and an elongate tread body 2 interconnected to each other. The nose member 1 is made of a single, unbroken, solid piece of higher quality wood, and extends the full height and full length of the stairtread. The nose member 1 has a first longitudinal edge surface 101 and a second longitudinal edge surface 102 opposite to the first longitudinal edge surface 101. The second longitudinal edge surface 102 is rounded in cross section to form the nose of the stairtread. The elongate tread body 2 includes a core layer 201 having a top face, a top layer 202 having a bottom face glued to the top face of the core layer 201, and a longitudinal edge surface 203 glued to the first longitudinal edge surface 101 of the nose member 1. The core layer 201 is made of a plurality of first elongate thicker lamellas 201' which are glued laterally and adjacently to each other. The first elongate thicker lamellas 201' are made of lower quality wood, and include one thicker lamella 201" that is most distal from the nose member 1. The thicker lamella 201" is made of a single, unbroken piece of lower quality wood material, and extends the full length of the stairtread. The top layer 202 is made of a plurality of single, unbroken, second elongate thinner lamellas 202' which are glued laterally and adjacently to each other. The second elongate thinner lamellas 202' are made of higher quality wood. The top layer 202 and the nose member 1 define continuous higher quality wooden apparent top and nose surfaces of the stairtread.

Although the conventional wooden stairtread uses a combination of the higher and lower quality wood materials to help reduce consumption and destruction of forest resources, the stairtread does not convey a wholly covered higher quality wood appearance.

SUMMARY OF THE INVENTION

Therefore, the main object of the present invention is to provide a wooden stairtread having all surfaces thereof covered by higher quality wood.

According to this invention, a wooden stairtread having a length, height and depth, comprises an elongate nose member, an elongate tread body, and a tread end member. The elongate nose member extends the full length and full height of the stairtread, is made of higher quality wood, and has a longitudinal front curved surface, a longitudinal connecting end surface opposite to the longitudinal front curved surface, and two opposite lateral end surfaces. The longitudinal connecting end surface has upper and lower longitudinal edges. The elongate tread body extends the full length and full height of the stairtread, and has first and second longitudinal connecting end surfaces. The first longitudinal connecting end surface is connected to the longitudinal connecting end surface of the nose member. The second longitudinal connecting end surface is opposite to the first longitudinal connecting end surface. The tread body includes at least one elongate core layer, at least one upper surface layer, and at least one lower surface layer. The elongate core layer is between the first and second longitudinal connecting end surfaces, and has top and bottom sides. The upper surface layer is secured to the top side of the core layer, and has a top side flush with the upper longitudinal edge of the longitudinal connecting end surface of the nose member. The lower surface layer is secured to the bottom side of the core layer, and has a bottom side flush with the lower longitudinal edge of the longitudinal connecting end surface of the nose member. The core layer includes two lateral end members and at least one middle core member between the lateral end members. Each of the lateral end members has an end face that is flush with a respective one of the lateral end surfaces of the nose member. The lateral end members and the upper and lower surface layers are made of higher quality wood. The middle core member is made of lower quality wood. The tread end member is opposite to the nose member, is made of higher quality wood, and is connected to the second longitudinal connecting end surface of the tread body.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 2:
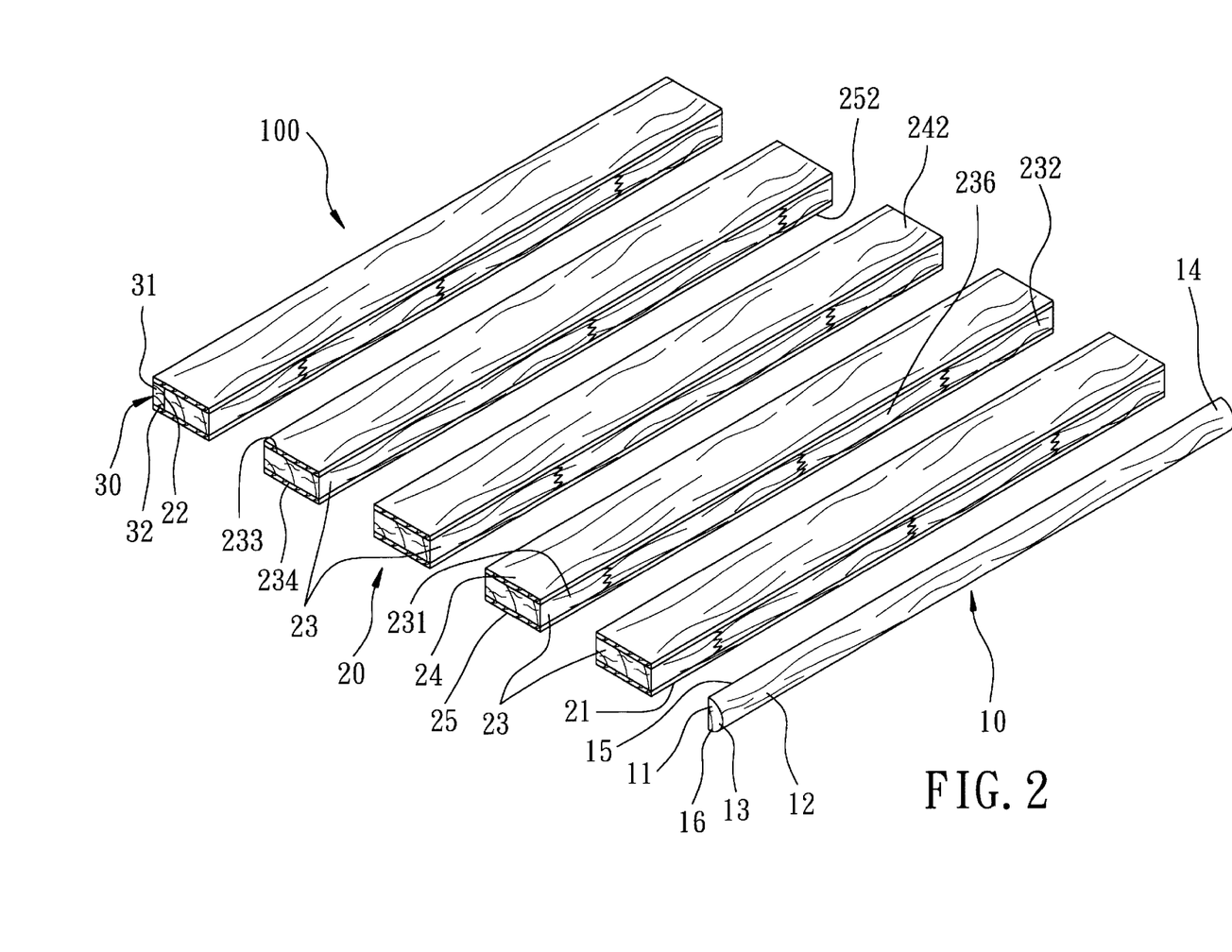
FIG. 2 is an exploded perspective view of the first preferred embodiment of a wooden stairtread according to the present invention.
Figure 3:
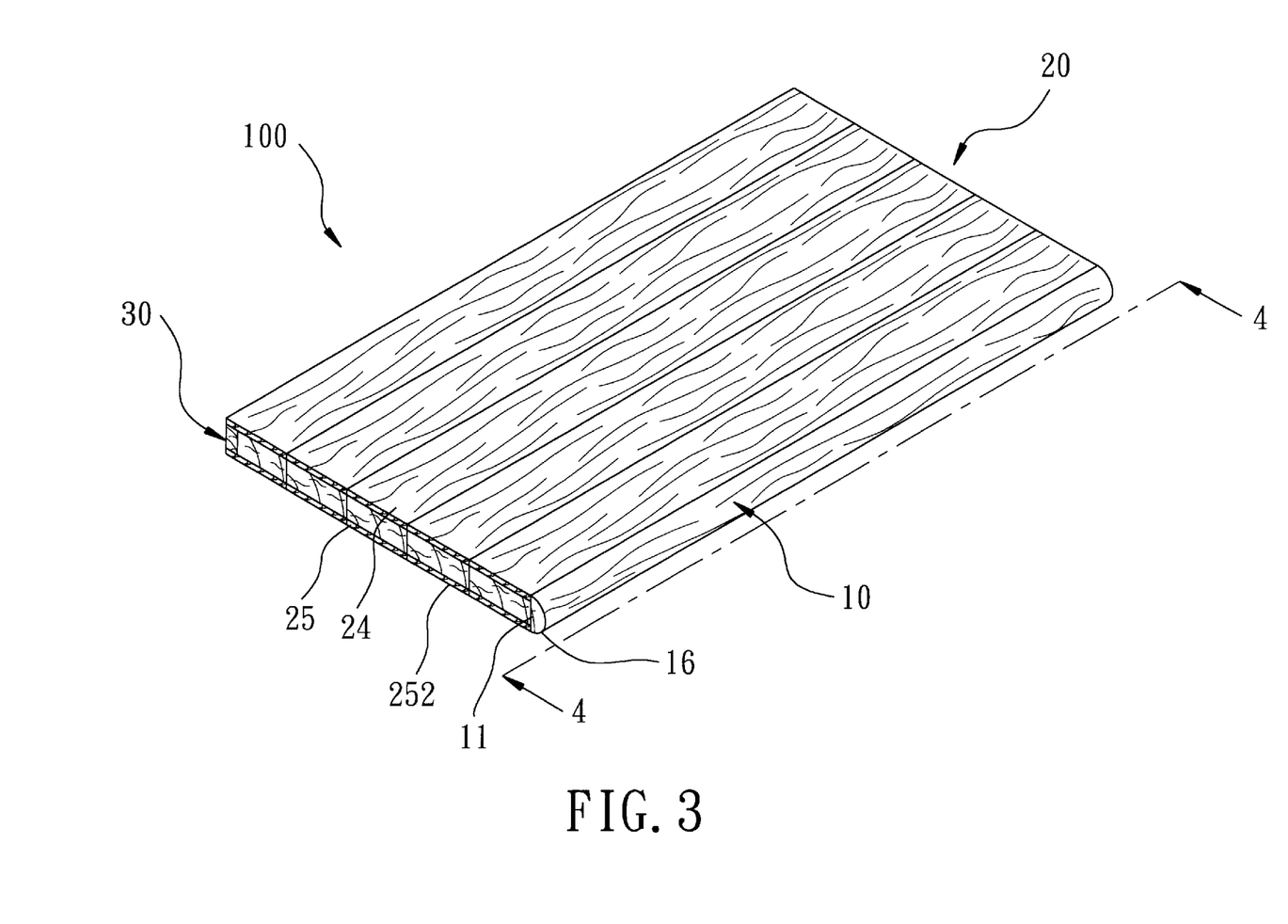
FIG. 3 is an assembled perspective view of the first preferred embodiment.
Figure 4:
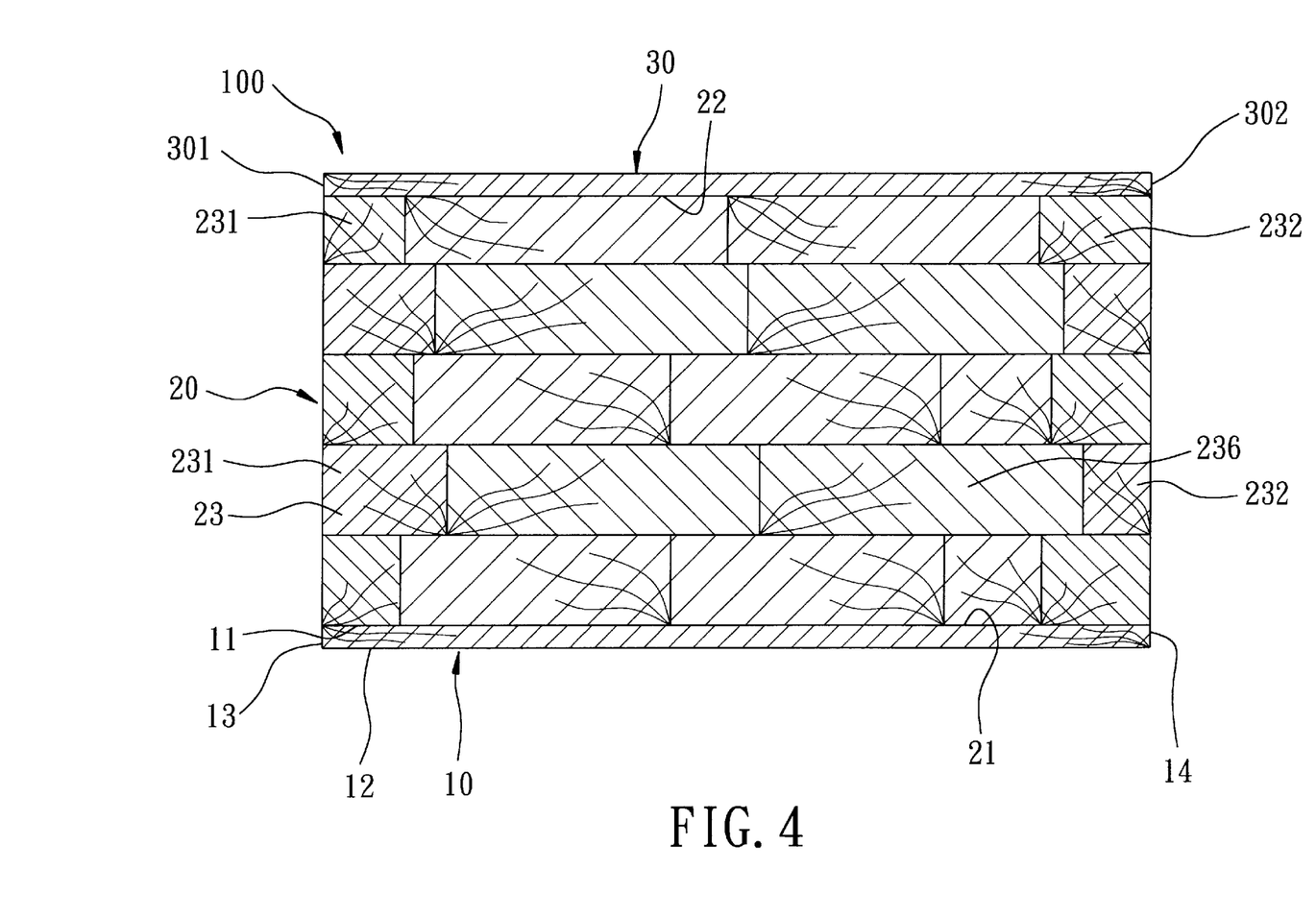
FIG. 4 is a schematic cross-sectional view of the first preferred embodiment taken along line 4—4 of FIG. 3.

Referring to FIGS. 2 to 4, the first preferred embodiment of a wooden stairtread 100 according to the present invention is shown to have a length, height and depth, and comprises an elongate nose member 10, an elongate tread body 20, and a tread end member 30. The elongate nose member 10 is a single, unbroken, solid piece having a semi-circular cross-section, extends the full length and full height of the stairtread 100, and is made of higher quality wood, such as oak and maple. The nose member 10 has a longitudinal front curved surface 12, a longitudinal connecting end surface 11 opposite to the longitudinal front curved surface 12, and two opposite lateral end surfaces 13, 14. The longitudinal connecting end surface 11 has upper and lower longitudinal edges 15, 16.

The elongate tread body 20 extends the full length and full height of the stairtread 100, and has first and second longitudinal connecting end surfaces 21, 22. The first longitudinal connecting end surface 21 is connected to the longitudinal connecting end surface 11 of the nose member 10. The second longitudinal connecting end surface 22 is opposite to the first longitudinal connecting end surface 21 and is most remote from the nose member 10. In this embodiment, the tread body 20 includes five elongate core layers, and five corresponding upper and lower surface layers 24, 25. The elongate core layers 23 are interconnected side-by-side along the depth of the stairtread 100, such as by gluing, and are disposed between the first and second longitudinal connecting end surfaces 21, 22 of the tread body 20. Each core layer 23 has top and bottom sides 233, 234. Each of the upper surface layers 24 is connected to the top side 233 of the respective core layer 23, such as by gluing, and has a top side 242 flush with the upper longitudinal edge 15 of the longitudinal connecting end surface 11 of the nose member 10. The upper surface layers 24 are thus disposed side-by-side along the depth of the stairtread 100. Each of the lower surface layers 25 is connected to the bottom side 234 of the respective core layer 23, such as by gluing, and has a bottom side 252 flush with the lower longitudinal edge 16 of the longitudinal connecting end surface 11 of the nose member 10 (see FIG. 3). The lower surface layers 25 are thus disposed side-by-side along the depth of the stairtread 100. Each of the upper and lower surface layers 24, 25 is made of a single, unbroken lamella that extends along the full length of the stairtread 100, and is made of higher quality wood, such as oak and maple.

Each of the elongate core layers 23 includes two lateral end members 231, 232 and at least one middle core member 236 between the lateral end members 231, 232. In this embodiment, adjacent ones of the lateral end members 231, 232 and the middle core members 236 are interconnected by means of finger joints. Each of the lateral end members 231, 232 has an end face that is flush with a respective one of the lateral end surfaces 13, 14 of the nose member 10 (see FIG. 4). The lateral end members 231, 232 are made of higher quality wood, such as oak and maple, whereas each middle core member 236 is made of lower quality wood, such as rubber wood and pine wood from plantation forests, discarded higher quality wood, and high density fiber material.

The tread end member 30 is opposite to the nose member 10, is made of a single, unbroken piece of higher quality wood, such as oak and maple, and is connected to the second longitudinal connecting end surface 22 of the tread body 20. The tread end member 30 has opposite end surfaces 301, 302, and top and bottom surfaces 31, 32. The opposite end surfaces 301, 302 are respectively flush with the lateral end surfaces 13, 14 of the nose member 10 (see FIG. 4). The top and bottom surfaces 31, 32 are covered by a pair of the upper and lower surface layers 24, 25 of the tread body 20, respectively.

After assembly, as shown in FIGS. 3 and 4, the stairtread 100 has front and rear views from which the nose member 10 and the tread end member 30 are visible, has opposite lateral sides from which the lateral end members 231, 232 of the core layers 23 and the upper and lower surface layers 24, 25 of the tread body 20 are visible, and top and bottom views from which the upper and lower surface layers 24, 25 of the tread body 20 are visible. Thus, the wooden stairtread 100 of the present invention has all six surfaces thereof covered by higher quality wood and presents a continuous higher quality wood appearance.

Although the core layers 23 include the lateral end members 231, 232 made of higher quality wood, use of higher quality wood is not significantly increased in the stairtread 100 as compared to the conventional wooden stairtread described beforehand in view of the semi-circular cross-section of the nose member 10. Thus, the lower quality wood can still occupy a greater portion of the stairtread 100, that is, the stairtread 100 can use 70% plantation forest woods and 30% higher quality wood, thereby reducing consumption of higher quality wood material to a minimum.

Figure 5:
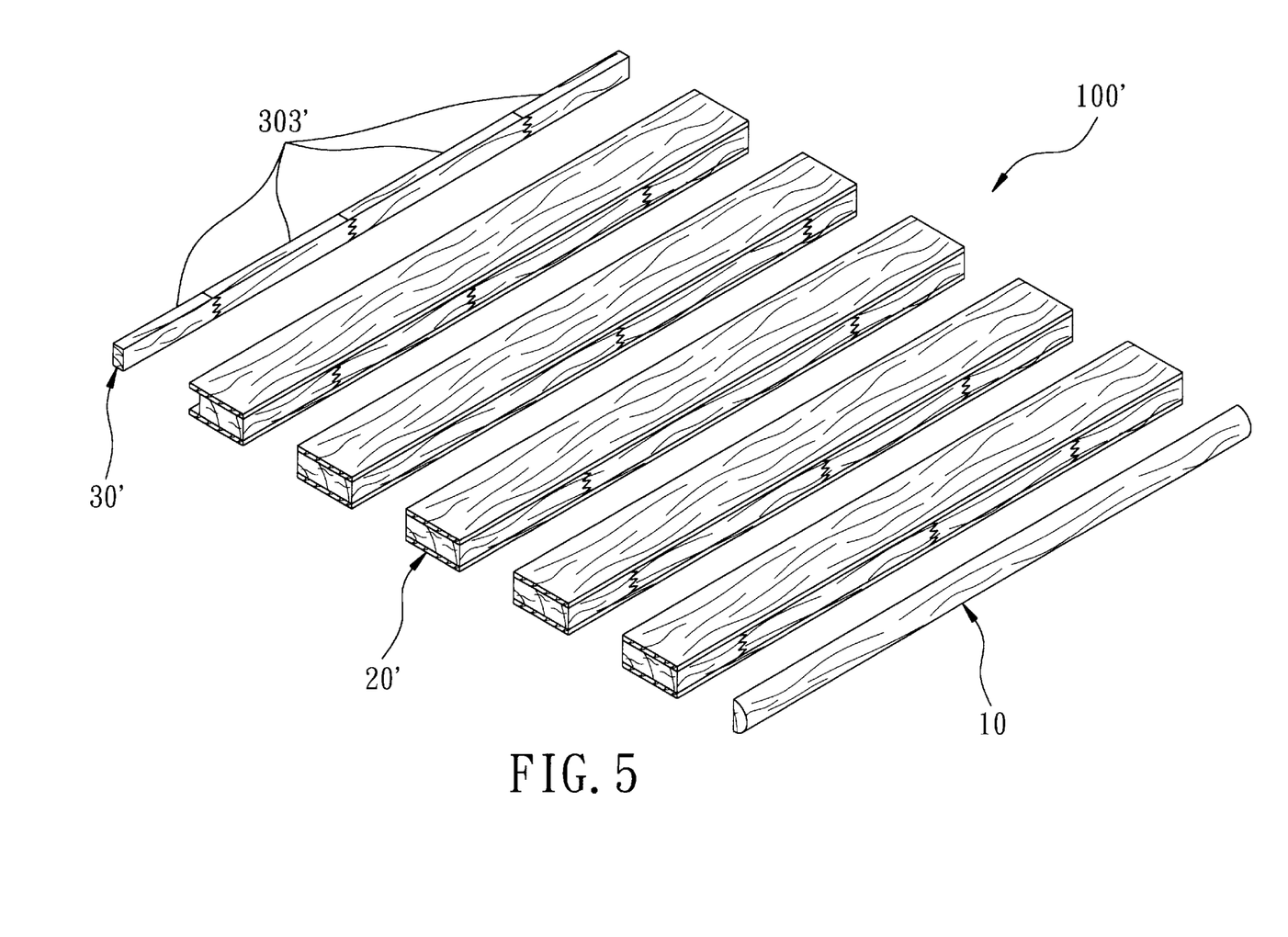
FIG. 5 is an exploded perspective view of the second preferred embodiment of the wooden stairtread according to the present invention.

Referring to FIG. 5, the second preferred embodiment of the wooden stairtread 100' according to the present invention is shown to be substantially similar to the first preferred embodiment. In this embodiment, the tread end member 30' includes a plurality of wood sections 303' that are arranged in succession along the full length of the stairtread 100'. Adjacent ones of the wood sections 303' are interconnected by means of finger joints.

Figure 6:
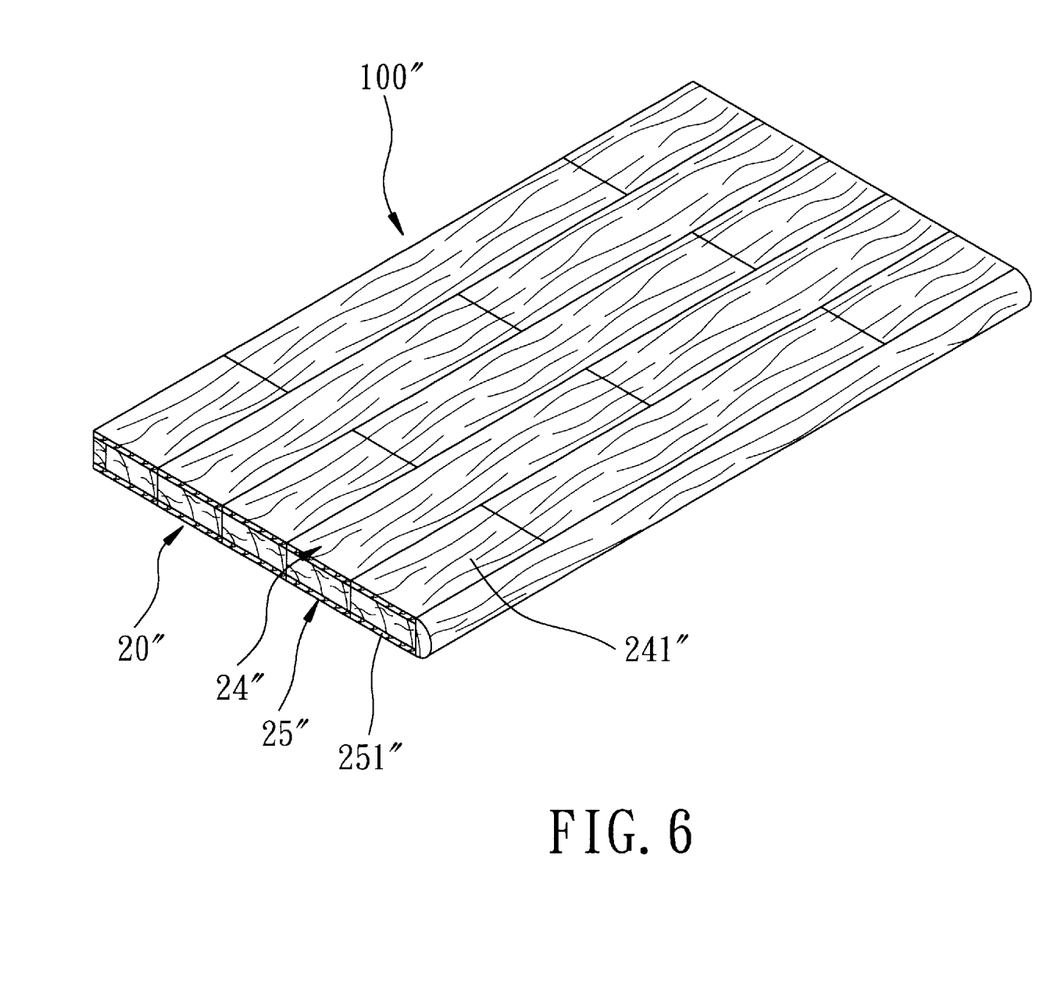
FIG. 6 is an assembled perspective view of the third preferred embodiment of the wooden stairtread according to the present invention.

FIG. 6 illustrates the third preferred embodiment of the wooden stairtread 100" according to the present invention. The third preferred embodiment is substantially similar to the first preferred embodiment. However, unlike the first preferred embodiment, each of the upper and lower surface layers 24", 25" of the tread body 20" includes a plurality of lamella sections 241", 251" that are arranged in succession along the full length of the stairtread 100".

Figure 7:
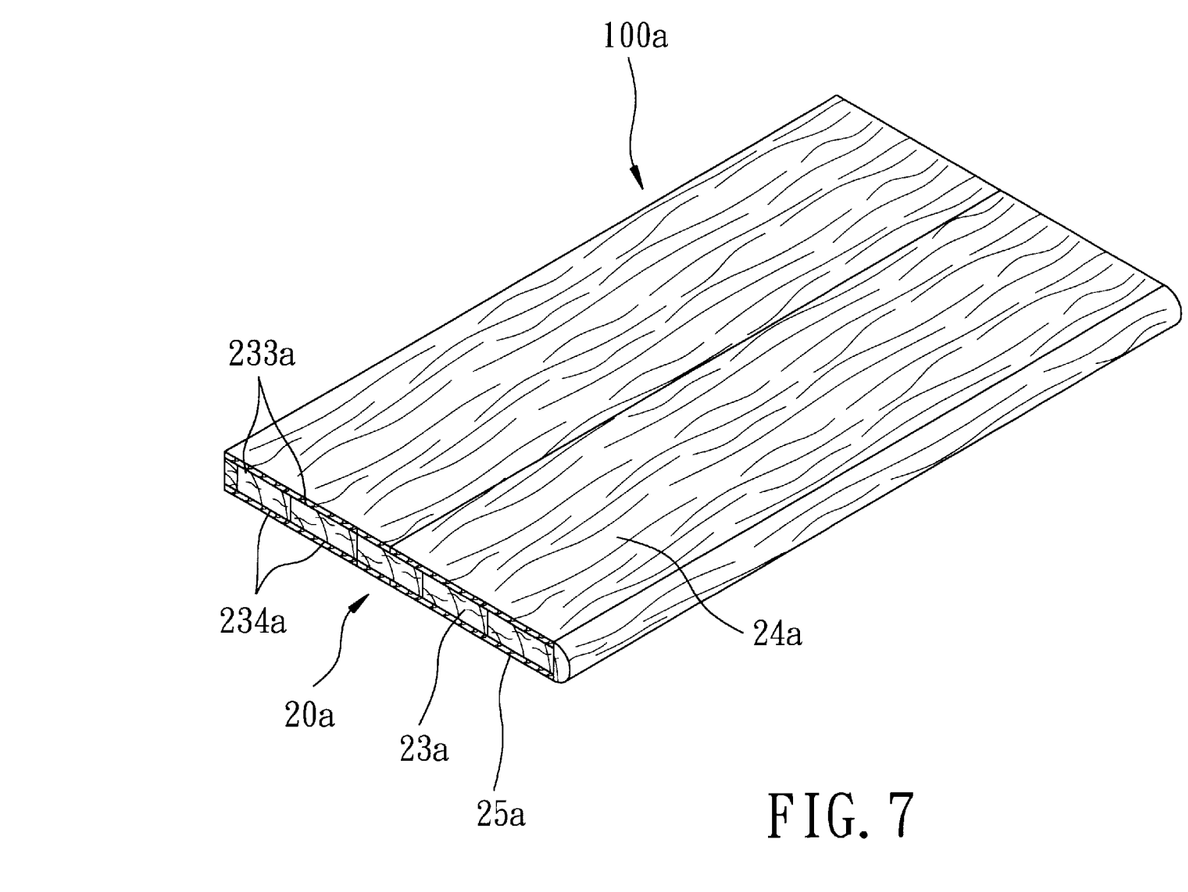
FIG. 7 is an assembled perspective view of the fourth preferred embodiment of the wooden stairtread according to the present invention.

Referring to FIG. 7, the fourth preferred embodiment of the wooden stairtread 100a according to the present invention is shown to be substantially similar to the first preferred embodiment. In this embodiment, the tread body 20a includes five core layers 23a that are interconnected side-by-side along the depth of the stairtread 100a, two upper surface layers 24a, and two lower surface layers 25a. The upper surface layers 24a are disposed side-by-side along the depth of the stairtread 100a, and each upper surface layer 24a is connected to the top side 233a of more than one of the core layers 23a. The lower surface layers 25a are disposed side-by-side along the depth of the stairtread 100a, and each lower surface layer 25a is connected to the bottom side 234a of more than one of the core layers 23a.

Figure 8:
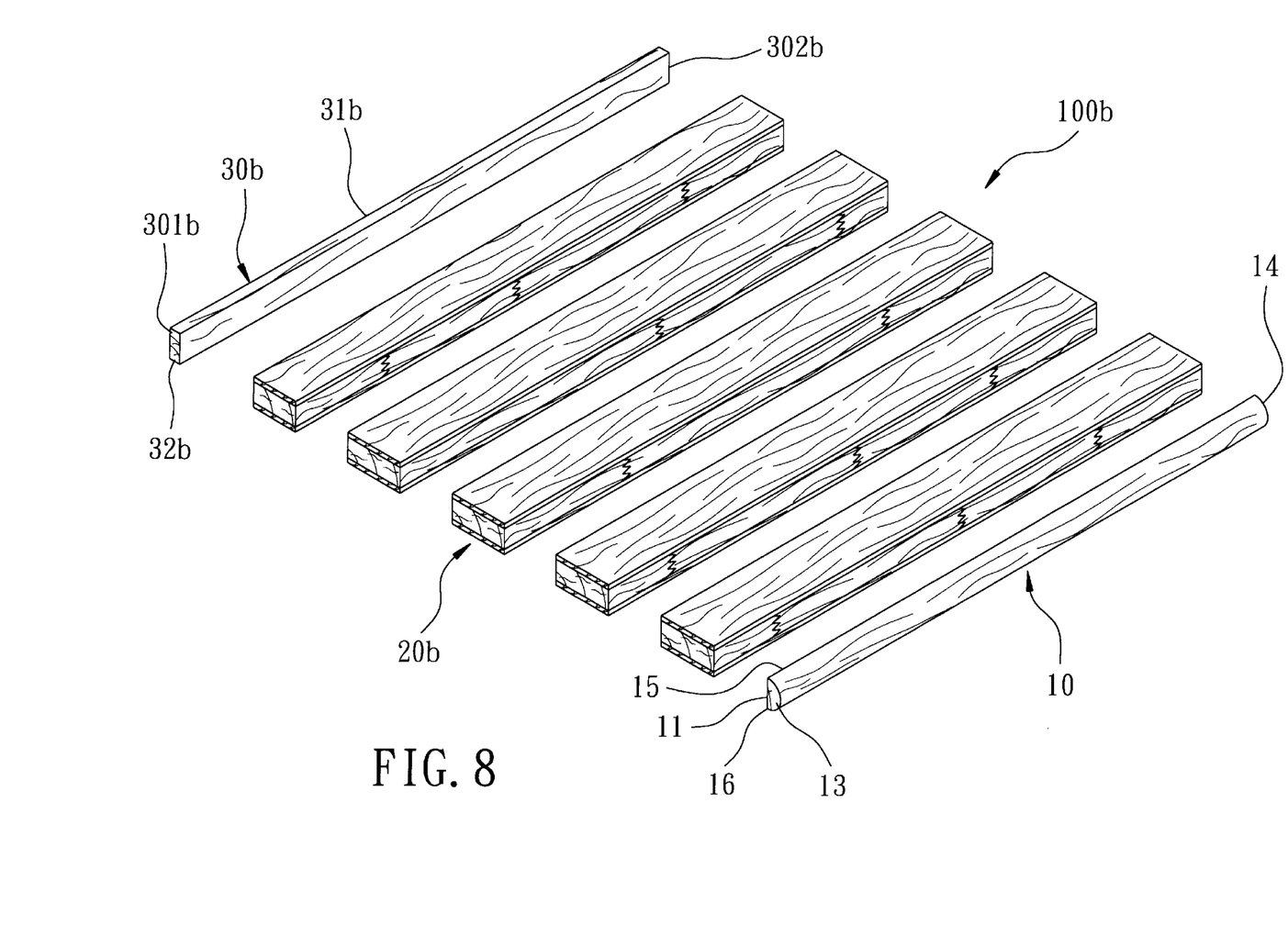
FIG. 8 is an exploded perspective view of the fifth preferred embodiment of the wooden stairtread according to the present invention.

FIG. 8 illustrates the fifth preferred embodiment of the wooden stairtread 100b according to the present invention. The fifth preferred embodiment is substantially similar to the first preferred embodiment. However, in this embodiment, the tread end member 30b extends along the full length and full height of the stairtread 100b, and has opposite end surfaces 301b, 302b respectively flush with the lateral end surfaces 13, 14 of the nose member 10, and top and bottom surfaces 31b, 32b respectively flush with the upper and lower longitudinal edges 15, 16 of the longitudinal connecting end surface 11 of the nose member 10.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A wooden stairtread having a length, height and depth, comprising:

an elongate nose member extending the full length and full height of said stairtread, said nose member being made of higher quality wood, and having a longitudinal front curved surface, a longitudinal connecting end surface opposite to said longitudinal front curved surface, and two opposite lateral end surfaces, said longitudinal connecting end surface having upper and lower longitudinal edges;

an elongate tread body extending the full length and full height of said stairtread, and having a first longitudinal connecting end surface connected to said longitudinal connecting end surface of said nose member, and a second longitudinal connecting end surface opposite to said first longitudinal connecting end surface, said tread body including at least one elongate core layer between said first and second longitudinal connecting end surfaces, and having top and bottom sides, at least one upper surface layer secured to said top side of said core layer, and having a top side flush with said upper longitudinal edge of said longitudinal connecting end surface of said nose member, and at least one lower surface layer secured to said bottom side of said core layer, and having a bottom side flush with said lower longitudinal edge of said longitudinal connecting end surface of said nose member, said core layer including two lateral end members and at least one middle core member between said lateral end members, each of said lateral end members having an end face that is flush with a respective one of said lateral end surfaces of said nose member, said lateral end members and said upper and lower surface layers being made of higher quality wood, said middle core member being made of lower quality wood; and a tread end member opposite to said nose member, made of higher quality wood, and connected to said second longitudinal connecting end surface of said tread body.

2. The wooden stairtread as claimed in claim 1, wherein said nose member is a single, unbroken, solid piece.

3. The wooden stairtread as claimed in claim 1, wherein said nose member has a semi-circular cross-section.

4. The wooden stairtread as claimed in claim 1, wherein said tread end member is a single, unbroken piece.

5. The wooden stairtread as claimed in claim 1, wherein said tread end member includes a plurality of wood sections that are arranged in succession along the full length of said stairtread.

6. The wooden stairtread as claimed in claim 1, wherein said tread end member has opposite end surfaces flush with said lateral end surfaces of said nose member, respectively.

7. The wooden stairtread as claimed in claim 1, wherein said tread end member has top and bottom surfaces that are covered by said upper and lower surface layers of said tread body, respectively.

8. The wooden stairtread as claimed in claim 1, wherein said tread end member extends along the full length and full height of said stairtread, and has opposite end surfaces respectively flush with said lateral end surfaces of said nose member, and top and bottom surfaces respectively flush with said upper and lower longitudinal edges of said longitudinal connecting end surface of said nose member.

9. The wooden stairtread as claimed in claim 1, wherein at least one of said upper and lower surface layers includes a single, unbroken lamella that extends along the full length of said stairtread.

10. The wooden stairtread as claimed in claim 9, wherein said tread body includes at least two of said upper surface layers that are disposed side-by-side along the depth of said stairtread.

11. The wooden stairtread as claimed in claim 10, wherein said tread body includes a number of said core layers that are interconnected side-by-side along the depth of said stairtread, and a corresponding number of said upper surface layers that are connected to said top sides of said core layers, respectively.

12. The wooden stairtread as claimed in claim 10, wherein said tread body includes a first number of said core layers that are interconnected side-by-side along the depth of said stairtread, and a second number of said upper surface layers, the first number being greater than the second number such that each of said upper surface layers is connected to said top side of more than one of said core layers.

13. The wooden stairtread as claimed in claim 9, wherein said tread body includes at least two of said lower surface layers that are disposed side-by-side along the depth of said stairtread.

14. The wooden stairtread as claimed in claim 13, wherein said tread body includes a number of said core layers that are interconnected side-by-side along the depth of said stairtread, and a corresponding number of said lower surface layers that are connected to said bottom sides of said core layers, respectively.

15. The wooden stairtread as claimed in claim 13, wherein said tread body includes a first number of said core layers that are interconnected side-by-side along the depth of said stairtread, and a second number of said lower surface layers, the first number being greater than the second number such that each of said lower surface layers is connected to said bottom side of more than one of said core layers.

16. The wooden stairtread as claimed in claim 1, wherein at least one of said upper and lower surface layers includes a plurality of lamella sections that are arranged in succession along the full length of said stairtread.

17. The wooden stairtread as claimed in claim 16, wherein said tread body includes at least two of said upper surface layers that are disposed side-by-side along the depth of said stairtread.

18. The wooden stairtread as claimed in claim 17, wherein said tread body includes a number of said core layers that are interconnected side-by-side along the depth of said stairtread, and a corresponding number of said upper surface layers that are connected to said top sides of said core layers, respectively.

19. The wooden stairtread as claimed in claim 16, wherein said tread body includes at least two of said lower surface layers that are disposed side-by-side along the depth of said stairtread.

20. The wooden stairtread as claimed in claim 19, wherein said tread body includes a number of said core layers that are interconnected side-by-side along the depth of said stairtread, and a corresponding number of said lower surface layers that are connected to said bottom sides of said core layers, respectively.

* * * * *